(12) United States Patent
Do

(10) Patent No.: US 11,745,117 B1
(45) Date of Patent: Sep. 5, 2023

(54) ATMOSPHERIC WATER HARVESTING GENERATOR

(71) Applicant: Yoonseo Do, Seoul (KR)

(72) Inventor: Yoonseo Do, Seoul (KR)

( * ) Notice: Subject to any disclaimer, the term of this patent is extended or adjusted under 35 U.S.C. 154(b) by 0 days.

(21) Appl. No.: 18/086,677

(22) Filed: Dec. 22, 2022

(30) Foreign Application Priority Data

Jun. 13, 2022 (KR) .......................... 10-2022-0071299

(51) Int. Cl.
*B01D 53/04* (2006.01)
*B01D 5/00* (2006.01)

(52) U.S. Cl.
CPC ......... *B01D 5/0057* (2013.01); *B01D 5/0003* (2013.01); *B01D 5/009* (2013.01); *B01D 5/0054* (2013.01); *B01D 53/04* (2013.01); *B01D 2253/204* (2013.01); *B01D 2253/306* (2013.01); *B01D 2253/308* (2013.01); *B01D 2253/311* (2013.01); *B01D 2257/80* (2013.01); *B01D 2259/40098* (2013.01)

(58) Field of Classification Search
CPC .. B01D 5/0057; B01D 5/0003; B01D 5/0054; B01D 5/009; B01D 53/04; B01D 2253/204; B01D 2253/306; B01D 2253/308; B01D 2253/311; B01D 2257/80; B01D 2259/40007; B01D 2259/40009; B01D 2259/4009; B01D 2259/40098

USPC .... 95/114, 115, 117, 122, 123; 96/121, 126, 96/146
See application file for complete search history.

(56) References Cited

U.S. PATENT DOCUMENTS

| | | | | |
|---|---|---|---|---|
| 3,734,293 A | * | 5/1973 | Biskis | B01D 53/0438 210/269 |
| 10,683,644 B2 | * | 6/2020 | Kim | C02F 1/288 |
| 11,602,712 B2 | * | 3/2023 | Eickhoff | B01D 53/0438 |
| 2012/0097029 A1 | * | 4/2012 | Hodgson | B01D 53/343 95/91 |
| 2012/0160098 A1 | * | 6/2012 | Papale | B01D 53/0476 96/127 |
| 2021/0299607 A1 | * | 9/2021 | Xia | B01D 53/0423 |

FOREIGN PATENT DOCUMENTS

KR 20220032168 A 3/2022

* cited by examiner

*Primary Examiner* — Frank M Lawrence, Jr.
(74) *Attorney, Agent, or Firm* — Bayramoglu Law Offices LLC

(57) ABSTRACT

An atmospheric water harvesting generator includes an adsorbent with a nanopore structure and a moisture-condensing substrate with an amphiphilic structure such that water can be efficiently harvested from the atmosphere even in a dry climate, the generator is easy to operate with little power, and the flow of air can be controlled with a simple control to efficiently and continuously harvest water.

17 Claims, 2 Drawing Sheets

ATMOSPHERIC WATER HARVESTING GENERATOR

CROSS REFERENCE TO THE RELATED APPLICATIONS

This application is based upon and claims priority to Korean Patent Application No. 10-2022-0071299, filed on Jun. 13, 2022, the entire contents of which are incorporated herein by reference.

TECHNICAL FIELD

The present invention relates to an atmospheric water harvesting generator, and more specifically to an atmospheric water harvesting generator in which water can be efficiently harvested from the atmosphere even in a dry climate, the generator is easy to operate with little power, and the flow of air can be controlled with a simple control to efficiently and continuously harvest water.

BACKGROUND

About 70% of the Earth's surface is composed of water, of which about 2.5% is freshwater that can be used by humans, and 80% of this freshwater is trapped in glaciers and ice fields and is unavailable for use. For other reasons, only about 1% of the water on the Earth is available for human use. As such, the amount of usable water circulating on the Earth is constant, but the population and water consumption on the Earth have increased by 2.5 to 3% every year since World War II. Since water is also a limited resource on the Earth, it is an important task for mankind to create technology to manage existing fresh water and create drinkable water.

Science and technology to create drinkable water for people in regions suffering from water shortage can be classified into four major categories. The first technology is seawater desalination technology that removes NaCl from seawater and turns it into fresh water. The technology for removing salt, that is, NaCl, from seawater includes a reverse osmosis method and an evaporation method. Reverse osmosis technology is a technique for filtering salt dissolved in seawater by applying pressure to seawater by placing a semipermeable membrane material between seawater and saltwater that allows water to pass through but does not allow salt to pass through. Evaporation technology is a desalination technique for removing impurities from water in which water evaporated by heating seawater is collected. The second technology is a technique for the integrated management of water resources by introducing a system for integrated management of all facilities related to water resources, such as waterworks, sewage, rivers, reservoirs and the like. It is a technique for saving water by actually installing sensors to collect data such as the amount of rain, water levels of rivers and reservoirs, temperature and humidity, wind strength and the like in order to manage water resources. One example of the well-known sewage treatment technology is a technique in which suspended matter in water is coagulated using bubbles, precipitated and primarily purified, and the primarily purified water is treated with chemicals to be purified as usable water after secondary purification. The third technology is artificial rain technology. The artificial rain technology is a technique for artificially sprinkling materials that become seeds of rain such that it rains in a specific area, when the cloud layer is formed but the cloud does not grow into raindrops because there are few condensation nuclei in the cloud. The fourth technology is a technique for condensing water vapor in the air or water that exists as very small droplets and collecting it as drinkable water. This technique can be largely divided into a technique for condensing water with the help of external energy and a method for using only the daily temperature difference and condenser without the help of external energy.

Technologies for generating water through the condensation of water the atmosphere should be ubiquitous and readily linkable to renewable energy sources according to local needs. In general, viable atmospheric water harvesting technologies must meet five basic conditions. Firstly, it must be efficient. Secondly, it should be cheap. Thirdly, it must be scalable. Fourthly, it should be broadband. Fifthly, it must be possible to harvest all year round.

However, none of the currently used atmospheric water harvesting generators (AWG) meet these five criteria due to thermodynamically and energy-inefficient technologies.

[Related Art Documents]
[Patent Documents]
Korean Patent Application No. 10-2022-0032168(published on Mar. 15, 2022

SUMMARY

[Technical Problem]

The present invention has been devised to overcome the above-described problems, and is directed to providing an atmospheric water harvesting generator which is capable of efficiently harvesting water from the atmosphere even in a dry climate.

In addition, the present invention is directed to providing an atmospheric water harvesting generator which is economically advantageous because the generator can be easily operated with little power.

In addition, the present invention is directed to providing an atmospheric water harvesting generator which is capable of efficiently and continuously harvesting water by controlling the flow of air with only a simple control.

[Technical Solution]

In order to solve the above-described problems, the atmospheric water harvesting generator of the present invention may include a Peltier element-based cooling/heating part in which an air inlet hole is formed to introduce moisture-containing air from the outside to the inside through the air inlet hole, and an air circulation hole is formed to introduce moisture-removed air through the air circulation hole, so as to cool or heat the introduced air; an adsorption/desorption part which is connected to the cooling/heating part, into which air cooled or heated by the cooling/heating part is introduced, so as to adsorb or desorb moisture contained in the introduced air; a condensation part which is connected to the adsorption/desorption part and the cooling/heating part such that air is introduced from the adsorption/desorption part, moisture contained in the introduced air is condensed, and the air from which moisture has been removed is discharged to the outside or transferred to the cooling/heating part; and a water storage part which is connected to the condensation part so as to store condensed water which is condensed in the condensation part.

In a preferred exemplary embodiment of the present invention, the cooling/heating part may include a cold chamber, a Peltier element and a hot chamber.

In a preferred exemplary embodiment of the present invention, the air inlet hole may be formed in the cold chamber to introduce moisture-containing air from the outside into the cold chamber.

In a preferred exemplary embodiment of the present invention, the air circulation hole may be formed in the hot chamber to introduce moisture-removed air into the hot chamber.

In a preferred exemplary embodiment of the present invention, the cold chamber may be in contact with a cold surface of the Peltier element, and the hot chamber may be in contact with a hot surface of the Peltier element.

In a preferred exemplary embodiment of the present invention, the cold chamber and the hot chamber may be separated from each other.

In a preferred exemplary embodiment of the present invention, the adsorption/desorption part may include a first chamber and a second chamber.

In a preferred exemplary embodiment of the present invention, the first chamber may include a plurality of adsorbents therein.

In a preferred exemplary embodiment of the present invention, the second chamber may include a plurality of adsorbents therein.

In a preferred exemplary embodiment of the present invention, the first chamber and the second chamber may be separated from each other.

In a preferred exemplary embodiment of the present invention, the condensation part may include a cooler for cooling the air introduced from the adsorption/desorption part; and a condenser for condensing moisture contained in the air introduced from the adsorption/desorption part.

In a preferred exemplary embodiment of the present invention, the atmospheric water harvesting generator may further include a first valve which is installed in a path through which air moves from the cooling/heating part to the adsorption/desorption part to control the flow of air moving from the cooling/heating part to the adsorption/desorption part.

In a preferred exemplary embodiment of the present invention, the atmospheric water harvesting generator of the present invention may further include a second valve which is installed in a path through which air moves from the adsorption/desorption part to the condensation part or the cooling/heating part to control the flow of air moving from the adsorption/desorption part to the condensation part or the cooling/heating part.

In a preferred exemplary embodiment of the present invention, the atmospheric water harvesting generator of the present invention may further include a control device which is connected to the first valve, the second valve, the air inlet hole and the air circulation hole to analyze the flow of air moving through the first valve, the second valve, the air inlet hole or the air circulation hole.

In a preferred exemplary embodiment of the present invention, the atmospheric water harvesting generator of the present invention may further include an electricity supply part which is connected to the control device and supplies electricity to the control device, the first valve, the second valve, the air inlet hole, the air circulation hole or the Peltier element.

In a preferred exemplary embodiment of the present invention, the electricity supply part may be an auxiliary battery for charging a smartphone or a portable solar-powered battery.

In a preferred exemplary embodiment of the present invention, the adsorbent may have a nanopore structure.

In a preferred exemplary embodiment of the present invention, the nanopore structure may have a BET specific surface area of 350 to 4,000 $m^2/g$, a pore size of 5 to 50 Å and a pore volume of 0.2 to 6.0 $m^2/g$.

In a preferred exemplary embodiment of the present invention, the adsorbent may include a metal-organic framework (MOF).

In a preferred exemplary embodiment of the present invention, the metal-organic framework may include at least one selected from MOF-801, MOF-803, MOF-805, MOF-841, MIL-101 (Cr), MIL-101 (Al), MIL-53 (Al), UiO-66, Cr-soc-MOF-1, CAU-10-H, DUT-67 and $Co_2Cl_2$ (BTDD).

In a preferred exemplary embodiment of the present invention, the condenser may include a moisture-condensing substrate having an amphiphilic structure.

In a preferred exemplary embodiment of the present invention, the moisture-condensing substrate having an amphiphilic structure may have a structure including hydrophilic or super-hydrophilic particles on one hydrophobic or super-hydrophobic surface In a preferred exemplary embodiment of the present invention, the moisture-condensing substrate having an amphiphilic structure may have a structure in which a hydrophilic or super-hydrophilic pattern is formed on one hydrophobic or super-hydrophobic surface.

In a preferred exemplary embodiment of the present invention, the structure in which a super-hydrophilic pattern is formed on one super-hydrophobic surface may include a substrate on which titanium dioxide ($TiO_2$) is formed in a hydrophilic domain pattern on one surface; and a compound represented by Chemical Formula 1 which is coated on a surface of titanium dioxide:

[Chemical Formula 1]

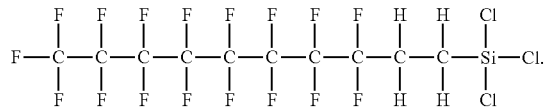

In a preferred exemplary embodiment of the present invention, the hydrophilic domain pattern may be a cylinder-shaped pattern, a cone-shaped pattern, a quadrangular prism-shaped pattern, a quadrangular pyramid-shaped pattern, a triangular prism-shaped pattern, a triangular pyramid-shaped pattern or a star-shaped pattern.

In a preferred exemplary embodiment of the present invention, the moisture- condensing substrate having an amphiphilic structure may have an area ratio of a hydrophobic surface and a hydrophilic surface of 1:0.05 to 0.6.

Meanwhile, the atmospheric water harvesting generator may include a flow of first air discharged from the inside to the outside after the air introduced from the outside to the inside moves sequentially to the air inlet hole, the cold chamber, the first valve, the first chamber adsorbing moisture, the second valve and the cooler; and a flow of second air in which after the air from which moisture has been removed in the condensation part moves sequentially to the air circulation hole, the hot chamber, the first valve, the second chamber for desorbing moisture, the second valve and the condenser, the condensed water which is condensed in the condenser is stored in a water storage part, wherein the flow of the first air and the flow of the second air proceed simultaneously to continuously harvest water.

Furthermore, in the atmospheric water harvesting generator, the roles of the first chamber and the second chamber are switched by the first valve such that the first chamber desorbs moisture and the second chamber absorbs moisture, and at the same time, the flow of air moving to the condensation part and the hot chamber is controlled by the second valve such that water can be harvested continuously.

Hereinafter, terms used in the present invention will be described.

As used herein, the term "low temperature" means a temperature of 0 to 30° C., and preferably, 2 to 10° C.

As used herein, the term "medium temperature" means a temperature of 10 to 50° C., and preferably, 20 to 40° C.

As used herein, the term "high temperature" means a temperature of 30 to 90° C., and preferably, 50 to 80° C.

As used herein, the term "low humidity" means a humidity of 10 to 50% RH, and preferably, 20 to 40% RH.

As used herein, the term "high humidity" means a humidity of 40 to 100% RH, and preferably, 50 to 90% RH.

However, since the terms "low temperature", "medium temperature", "high temperature", "low humidity" and "high humidity" used in the present invention may be relatively defined according to the temperature and humidity of an area where the atmospheric water harvesting generator of the present invention is used, the above terms are not limited thereto.

[Advantages]

The atmospheric water harvesting generator of the present invention can efficiently harvest water from the atmosphere even in a dry climate.

In addition, since the atmospheric water harvesting generator of the present invention is easy to operate little power, it has excellent mobility and is economically advantageous.

In addition, the atmospheric water harvesting generator of the present invention can efficiently and continuously harvest water by controlling the flow of air with a simple control.

DETAILED DESCRIPTION OF THE EMBODIMENTS

Figure 1:
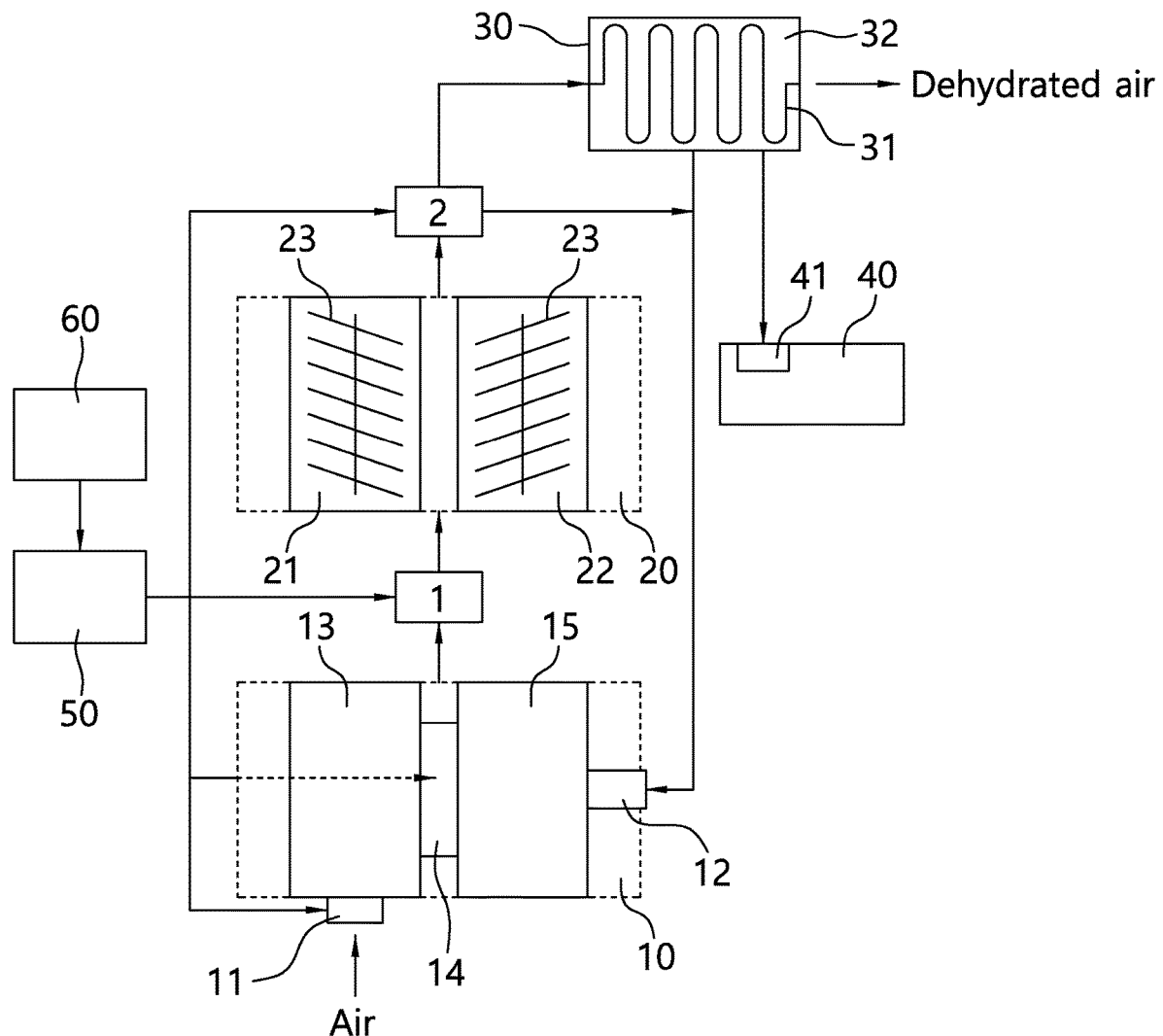
FIG. 1 is a diagram schematically showing the atmospheric water harvesting generator according to a preferred embodiment of the present invention.

Hereinafter, with reference to the accompanying drawings, exemplary embodiments of the present invention will be described in detail so that those skilled in the art can easily carry out the present invention. The present invention may be embodied in many different forms and is not limited to the exemplary embodiments set forth herein. In order to clearly describe the present invention in the drawings, parts that are irrelevant to the description are omitted, and the same reference numerals are added to the same or similar components throughout the specification.

Referring to FIG. 1, the atmospheric water harvesting generator of the present invention includes a Peltier element-based cooling/heating part 10, an adsorption/desorption part 20, a condensation part 30 and a water storage part 40.

First, the Peltier element-based cooling/heating part 10 has an air inlet hole 11 formed therein such that moisture-containing air is introduced therein through the air inlet hole 11, and the introduced air may be cooled or heated. In addition, the Peltier element-based cooling/heating part 10 has an air circulation hole 12 formed therein, through which air from which moisture has been removed in the condensation part 30 is introduced, and the introduced air may be cooled or heated.

Specifically, the cooling/heating part 10 may include a cold chamber 13, a Peltier element 14 and a hot chamber 15.

The Peltier element 14 is an electronic material using the Peltier effect (thermoelectric effect), and when a current flows, phenomena in which a temperature difference continues at both ends of several layers of conductive material are called the Peltier effect. The Peltier effect was discovered by French physicist Jean Charles Athanase Peltier in 1834 and theoretically established in the early 1900s. An object using the Peltier effect is called a Peltier element or a thermoelectric element, and when the high-temperature part on the opposite side requiring low-temperature cooling is forcibly cooled, the heat of the low-temperature part is transferred to the high-temperature side. When one side gets cold, the other side gets hot due to the Seebeck effect. Efficiency improves when the hot side is well cooled, and when it is overheated, the efficiency drops and eventually the element is destroyed, or the thermal reversal phenomenon occurs, which may cause the low-temperature part and the high-temperature part to be reversed.

As such, the Peltier element 14 may have a cold surface and a hot surface when electricity is supplied through an electricity supply part 60 to be described below. In this case, the cold chamber 13 may be in contact with a cold surface of the Peltier element 14, and the hot chamber 14 may be in contact with a hot surface of the Peltier element 13.

In addition, the cooling/heating part 10 may further include a metal structure which is capable of more quickly cooling or more quickly heating the air introduced into the cooling/heating part 10, by expanding the surface areas of the cold surface and the hot surface of the Peltier element 14 to facilitate heat exchange.

In addition, the cold chamber 13 and the hot chamber 15 may be separated from each other.

In addition, since the air inlet hole 11 is formed in the cold chamber 13, moisture-containing air which is present outside the atmospheric water harvesting generator may be introduced into the cold chamber 11.

In addition, since the air circulation hole 12 is formed in the hot chamber 14, the air from which moisture has been removed in the condensation part 30 may be introduced into the hot chamber 15.

In addition, an air filter may be installed in the air inlet hole 11, and foreign substances or impurities may be removed from the air introduced into the cold chamber 13 through the air filter such that only pure air is introduced into the cold chamber 13.

In addition, an air filter may be installed in the air circulation hole 12, and foreign substances or impurities may be removed from the air introduced into the hot chamber 15 through the air filter such that only pure air is introduced into the hot chamber 15.

Next, the adsorption/desorption part 20 is connected to the cooling/heating part 10, and air cooled or heated by the cooling/heating part 10 is introduced, and moisture contained in the introduced air may be adsorbed or desorbed.

Specifically, the adsorption/desorption part 20 may include a first chamber 21 and a second chamber 22. In this case, each of the first chamber 21 and the second chamber 22 includes a plurality of adsorbents 23 therein, and the first chamber 21 and the second chamber 22 may be separated from each other.

The adsorption/desorption part 20 includes an adsorbent having a nanopore structure, and since the adsorption/desorption part 20 is connected to the cooling/heating part 10, when the first chamber 21 plays a role of adsorbing moisture, moisture is adsorbed from the low-temperature, high-humidity air introduced from the cold chamber 13, and when the second chamber 22 plays a role of desorbing moisture, moisture is desorbed through the high-temperature, low-humidity air introduced from the hot chamber 15 such that in the adsorption/desorption part 20, moisture may be adsorbed or desorbed from the introduced low-temperature, high-humidity air and high-temperature, low-humidity air.

In addition, the roles of the first chamber 21 and the second chamber 22 in the adsorption/desorption part 20 may be switched only by air flow.

The adsorbent 23 is a material capable of adsorbing or desorbing moisture through a change in pressure or temperature, and it may include an adsorbent, a desiccant and/or an adsorbent complex capable of increasing energy efficiency, and it may have a nanopore structure.

Specifically, the nanopore structure may have a BET specific surface area of 350 to 4,000 m²/g, and preferably, a BET specific surface area of 2,000 to 2,600 m²/g, a pore size of 5 to 50 Å, and preferably, a pore size of 15 to 20 Å, and a pore volume of 0.2 to 6.0 m²/g, and preferably, 2.5 to 3.5 m²/g, and if these conditions are not satisfied, the water harvesting efficiency may be significantly reduced.

In addition, the adsorbent 23 may include a metal-organic framework (MOF). In this case, the metal-organic framework may include at least one selected from MOF-801, MOF-803, MOF-805, MOF-841, MIL-101 (Cr), MIL-101 (Al), MIL-53 (Al), UiO-66, Cr-soc-MOF-1, CAU-10-H, DUT-67 and $Co_2Cl_2$ (BTDD).

In addition, the plurality of adsorbents 23 may be designed to be detachable from the first chamber 21 and/or the second chamber 22 according to climate or economic conditions.

Next, the condensation part 30 is connected to the adsorption/desorption part 20 and the cooling/heating part 10 such that air is introduced from the adsorption/desorption part 20, and moisture contained in the introduced air is condensed, and the air from which moisture has been removed may be transferred to the cooling/heating part 10.

Specifically, the condensation part 30 includes a cooler 31 and a condenser 32, and the low-temperature, low-humidity air introduced from the adsorption/desorption part 20 is circulated through the cooler 31 to cool the condensation part 30, and the dehydrated air may be discharged to the outside of the atmospheric water harvesting generator. In addition, the high-temperature, high-humidity air introduced from the adsorption/desorption part 20 condenses moisture on the surface of the condenser 32, and the air from which the moisture is removed may be transferred to the cooling/heating part 10.

In addition, the condenser 32 may include a moisture-condensing substrate having an amphiphilic structure.

Specifically, the moisture-condensing substrate having an amphiphilic structure may have a structure including hydrophilic or super-hydrophilic particles on a hydrophobic or super-hydrophobic surface. In addition, the moisture-condensing substrate having an amphiphilic structure may have a structure in which a hydrophilic or super-hydrophilic pattern is formed on a hydrophobic or super-hydrophobic surface.

In addition, the moisture-condensing substrate having an amphiphilic structure may have an area ratio of a hydrophobic surface and a hydrophilic surface of 1: 0.05 to 0.6, and preferably, 1: 0.2 to 0.4, and by satisfying such an area ration range, it is possible to achieve the excellent water harvesting efficiency.

Meanwhile, the structure in which a super-hydrophilic pattern is formed on a super-hydrophobic surface may include a substrate on which titanium dioxide ($TiO_2$) is formed in a hydrophilic domain pattern on one surface and a compound represented by Chemical Formula 1 which is coated on the surface of the titanium dioxide:

[Chemical Formula 1]

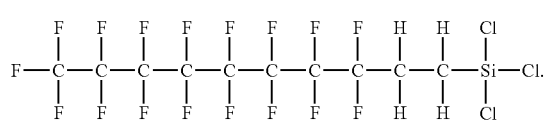

In this case, since titanium dioxide ($TiO_2$) has superhydrophilicity on a substrate formed with a hydrophilic domain pattern and the compound represented by Chemical Formula 1 may have superhydrophobicity, it may be a structure in which a super-hydrophilic pattern is formed on a super-hydrophobic surface.

Meanwhile, the hydrophilic domain pattern may have a cylinder-shaped pattern, a cone-shaped pattern, a quadrangular prism-shaped pattern, a quadrangular pyramid-shaped pattern, a triangular prism-shaped pattern, a triangular pyramid-shaped pattern or a star-shaped pattern.

Finally, the water storage part 40 is connected to the condensation part 30 to store the condensed water condensed in the condensation part 30. Specifically, the water storage part 40 may include a water purification filter 41, and the condensed water condensed in the condensation part 30 may be stored in the water storage part 40 after passing through the water purification filter 41.

Meanwhile, the atmospheric water harvesting generator of the present invention may further include a first valve 1 and a second valve 2.

The first valve 1 is installed in a path through which air moves from the cooling/heating part 10 to the adsorption/desorption part 20 such that it is possible to control the flow of air moving from the cooling/heating part 10 to the adsorption/desorption part 20. In this case, a 4-way valve may be used as the first valve 1.

The second valve 2 is installed in a path through which air moves from the adsorption/desorption part 20 to the condensation part 30 and/or the cooling/heating part 10 such that it is possible to control the flow of air moving from the adsorption/desorption part 20 to the condensation part 30 and/or the cooling/heating part 10. In this case, a 4-way valve may be used as the second valve 2.

Furthermore, the atmospheric water harvesting generator of the present invention may further include a control device 50 and an electricity supply part 60.

The control device 50 is connected to the first valve 1, the second valve 2, the air inlet hole 11 and the air circulation hole 12 to control and analyze the flow of air moving through the first valve 1, the second valve 2, the air inlet hole 11 or the air circulation hole 12. Through this analysis, it is possible to control to adjust the flow of air in the first valve 1, the second valve 2, the air inlet hole 11 or the air circulation hole 12 such that the atmospheric water harvesting generator of the present invention may efficiently and continuously harvest water.

The electricity supply part 60 is connected to the control device 50 and serves to supply electricity to a place requiring electricity, and specifically, it may supply electricity to the control device 50, the first valve 1, the second valve 2, the air inlet hole 11, the air circulation hole 12 or the Peltier element 14.

In this case, the electricity supply part 60 may be an auxiliary battery for charging a smartphone and/or a portable a portable solar-powered battery, and by using the same, it is possible to easily carry and use the atmospheric water harvesting generator, or the atmospheric water harvesting generator may be continuously used by being supplied with sustainable solar energy.

Meanwhile, the atmospheric water harvesting generator may include a flow of first air discharged from the inside to the outside after the air introduced from the outside to the inside moves sequentially to the air inlet hole 11, the cold chamber 13, the first valve 1, the first chamber 21 adsorbing moisture, the second valve 2 and the cooler 31; and a flow of second air in which after the air from which moisture has been removed in the condensation part 20 moves sequentially to the air circulation hole 12, the hot chamber 15, the first valve 1, the second chamber 22 for desorbing moisture, the second valve 2 and the condenser 32, the condensed water which is condensed in the condenser 32 is stored in the water storage part 40, wherein the flow of the first air and the flow of the second air proceed simultaneously to continuously harvest water.

Further, in the atmospheric water harvesting generator of the present invention, the roles of the first chamber 21 and the second chamber 22 may be switched by the first valve 1 such that the first chamber 21 desorbs moisture and the second chamber 22 adsorbs moisture, and at the same time, the flow of air moving to the condensation part 30 and the hot chamber 15 may be controlled by the second valve 2 such that it is possible to continuously harvest water.

Specifically, with reference to FIG. 2, the air flow and the operating mechanism capable of continuously harvesting water in the atmospheric water harvesting generator of the present invention will be described.

Figure 2:
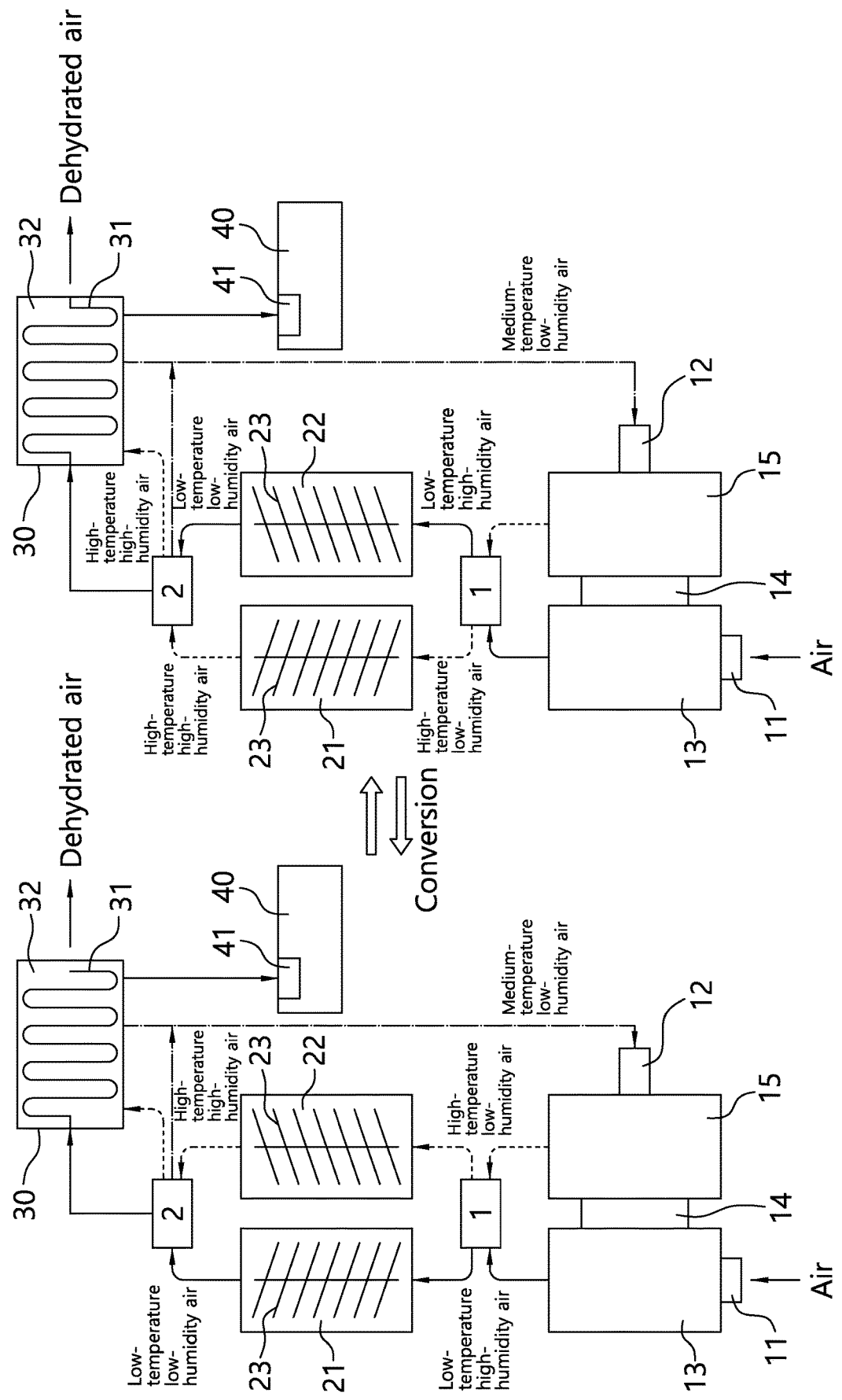
FIG. 2 is a diagram schematically showing the flow of air and the operating mechanism which is capable of continuously harvesting water in the atmospheric water harvesting generator of the present invention.

As shown in the drawing illustrated on the left side of FIG. 2, when moisture-containing air is introduced into the cold chamber 13 through the air inlet hole 11 formed in the cold chamber 13, the introduced air is cooled and converted to low temperature, high humidity air. The low-temperature, high-humidity air is transported to the first chamber 21 through the opening/closing control of the first valve 1 based on the information analyzed by the control device. Moisture contained in the low-temperature, high-humidity air transported to the first chamber 21 is adsorbed to the adsorbent 23 included in the first chamber 21. A part of the low-temperature, low-humidity air from which moisture has been removed by the adsorbent 23 is transported to the cooler 31 of the condensation part 30 through the opening/closing control of the second valve 2 based on the information analyzed by the control device, and due to this, the condensation part 30 is cooled, and at the same time, the air transferred to the cooler 31 of the condensation part 30 is discharged to the outside of the atmospheric water harvesting generator as dehydrated air, and the other part is transported to the hot chamber 15 as medium-temperature, low humidity air. The medium-temperature, low-humidity air transported from the condensation part 30 to the hot chamber 15 is heated and converted into high-temperature, low-humidity air. The high-temperature, low-humidity air is transported to the second chamber 22 through the opening/closing control of the first valve 1 based on the information analyzed by the control device. The adsorbent 23 included in the second chamber 22 desorbs moisture by the high-temperature, low-humidity air, and the high-temperature, low-humidity air is converted into high-temperature, high-humidity air. The high-temperature, high-humidity air is transported to the condenser 32 of the condensation part 30 through the opening/closing control of the second valve 2 based on the information analyzed by the control device, and the moisture of the high-temperature, high-humidity air transported to the condenser 32 of the condensation part 30 is condensed by a cooled moisture-condensing substrate of the condenser 32 having an amphiphilic structure to generate condensed water, and after the generated condensed water passes through a water purification filter 41, it is transported to the water storage part 40 to store the condensed water in the water storage part 40. In addition, the air from which moisture has been removed is transported to the hot chamber 15 as medium-temperature, low-humidity air and reused.

Meanwhile, by performing such a series of processes, moisture is completely desorbed from the adsorbent 23 included in the second chamber 22, and when moisture is completely adsorbed by the adsorbent 23 included in the first chamber 21, the roles of the first chamber 21 and the second chamber 22 are switched as shown in the drawing illustrated on the left side of FIG. 2 through the opening/closing control of the first valve 1 and the second valve 2 based on the information analyzed by the control device.

Specifically, when moisture-containing air is introduced into the cold chamber 13 through the air inlet hole 11 formed in the cold chamber 13, the introduced air is cooled and converted into low-temperature, high-humidity air. The low-temperature, high-humidity air is transported to the second chamber 22 through the opening/closing control of the first valve 1 based on the information analyzed by the control device. Moisture contained in the low-temperature, high-humidity air transported to the second chamber 22 is adsorbed by the adsorbent 23 included in the second chamber 22. A part of the low-temperature, low-humidity air from which moisture has been removed by the adsorbent 23 is transported to the cooler 31 of the condensation part 30 through the opening/closing control of the second valve 2 based on the information analyzed by the control device, and due to this, the condensation part 30 is cooled. At the same time, the air transported to the condensation part 30 is discharged to the outside of the atmospheric water harvesting generator as dehydrated air, and the other part is transported to the hot chamber 15 as medium temperature, low humidity air exiting the condensation part 30. The medium-temperature, low-humidity air transported from the condensation part 30 to the hot chamber 15 is heated and converted into high-temperature, low-humidity air. The high-temperature, low-humidity air is transported to the first chamber 21 through the opening/closing control of the first valve 1 based on the information analyzed by the control device. The adsorbent 23 included in the first chamber 21 desorbs moisture by the high-temperature, low-humidity air, and the high-temperature, low-humidity air is converted into high-temperature, high-humidity air. The high-temperature, high-humidity air is transported to the condenser 32 of the condensation part 30 through the opening/closing control of the second valve 2 based on the information analyzed by the control device, and the moisture of the high temperature, high humidity air transported to the condenser 32 of the condensation part is condensed by a cooled moisture-condensing substrate having an amphiphilic structure to generate condensed water, and after the generated condensed water passes through the air purification filter 41, it is transported to the water storage part 40 to store the condensed water in the water storage part 40. In addition, the air from which moisture has been removed is transported to the hot chamber 15 as medium-temperature, low-humidity air and reused. In addition, when the amount of medium-temperature, low-humidity air transported to the hot chamber 14 is insufficient, some of the low-temperature, low-humidity air may be supplemented by the opening/closing control of the second valve 2.

As such, while the atmospheric water harvesting generator of the present invention maintains the functions of the cold chamber 13 and the hot chamber 15 as they are by the operation of the Peltier element 14, only the flow of air inside the atmospheric water harvesting generator is converted, and thus, it is possible to harvest water continuously as well as efficiently. In other words, when the adsorbent 23 included in the first chamber 21 plays a role of adsorbing moisture, the adsorbent 23 included in the second chamber 22 plays a role of desorbing moisture, and when moisture is completely desorbed from the adsorbent 23 included in the second chamber 22 and moisture is completely adsorbed from the adsorbent 23 included in the first chamber 21, the flow of air inside the atmospheric water harvesting generator is converted, and thus, the adsorbent 23 included in the first chamber 21 plays a role of desorbing moisture, and the adsorbent 23 included in the second chamber 22 plays a role of adsorbing moisture, and thus, it is possible to continuously repeat the operating mechanism of the same atmospheric water harvesting generator as described above.

Further, in the atmospheric water harvesting generator of the present invention, the metal-organic framework (MOF) having a nanopore structure is used as the adsorbent 23 included in the first chamber 21 and the second chamber 22, respectively, and thus, even in a desert climate where the humidity of the air introduced from the outside is 30 to 40% or less, moisture may be adsorbed from the air cooled in the cold chamber 13 regardless of the humidity of the air, and thus, it may enable the operation of the atmospheric water harvesting generator regardless of a dry climate such as a desert.

In addition, the atmospheric water harvesting generator of the present invention transports high-temperature, high-pressure air, from which moisture is completely desorbed from the adsorbent 23 included in the second chamber 22 of the adsorption/desorption part 20, to the condenser in which cooling of the condensation part 30 is possible, and thus, in terms of generating condensed water by condensing moisture at a low temperature, when the moisture-condensing substrate in which the surface of the condenser 32 has an amphiphilic structure and it is possible to cool is used in combination with an adsorbent having a nanopore structure, it is possible to further enable the operation of the atmospheric water harvesting generator regardless of a dry climate such as a desert.

Meanwhile, the first atmospheric water harvesting generator, the second atmospheric water harvesting generator and the third atmospheric water harvesting generator of the present invention as illustrated in FIG. 1 were respectively installed in a place having air at a temperature of 18° C. and a humidity of 35%, and operated for 3 hours to harvest water, respectively. The first atmospheric water harvesting generator, the second atmospheric water harvesting generator and the third atmospheric water harvesting generator were respectively configured identically, but an adsorbent having a nanopore structure with a BET specific surface area of 2,312 $m^2/g$, a pore size of 17 Å and a pore volume of 3.1 $m^2/g$ was used as the adsorbent in the first atmospheric water harvesting generator, an adsorbent having a nanopore structure with a BET specific surface area of 1,248 $m^2/g$, a pore size of 55 Å and a pore volume of 7.3 $m^2/g$ was used as the adsorbent in the second atmospheric water harvesting generator, and an adsorbent having a nanopore structure with a BET specific surface area of 6,146 $m^2/g$, a pore size of 1.9 Å and a pore volume of 1.5 $m^2/g$ was used as the adsorbent in the third atmospheric water harvesting generator As a result of checking the water yields generated by the first atmospheric water harvesting generator, the second atmospheric water harvesting generator and the third atmospheric water harvesting generator, when the water yield generated by the first atmospheric water harvesting generator was set as 100%, it was confirmed that the water yield generated by the second atmospheric water harvesting generator was 86%, and the water yield generated by the third atmospheric water harvesting generator was 91%.

In addition, the fourth atmospheric water harvesting generator, the fifth atmospheric water harvesting generator, the sixth atmospheric water harvesting generator, the seventh atmospheric water harvesting generator and the eighth atmospheric water harvesting generator of the present invention as illustrated in FIG. 1 were respectively installed in a place having air at a temperature of 18° C. and a humidity of 35%, and operated for 3 hours to harvest water, respectively.

The fourth atmospheric water harvesting generator, the fifth atmospheric water harvesting generator, the sixth atmospheric water harvesting generator, the seventh atmospheric water harvesting generator and the eighth atmospheric water harvesting generator were respectively configured identically, but the fourth atmospheric water harvesting generator included a moisture-condensing substrate having a structure including hydrophilic particles on one hydrophobic surface and an amphiphilic structure in which the area ratio of a hydrophobic surface and a hydrophilic surface was 1:0.31 in the condenser, the fifth atmospheric water harvesting generator included a moisture-condensing substrate having a structure including hydrophilic particles on one hydrophobic surface and an amphiphilic structure in which the area ratio of a hydrophobic surface and a hydrophilic surface was 1:0.43 in the condenser, the sixth atmospheric water harvesting generator included a moisture-condensing substrate having a structure including hydrophilic particles on one hydrophobic surface and an amphiphilic structure in which the area ratio of a hydrophobic surface and a hydrophilic surface was 1:0.17 in the condenser, the seventh atmospheric water harvesting generator included a moisture-condensing substrate having a structure including hydrophilic particles on one hydrophobic surface and an amphiphilic structure in which the area ratio of a hydrophobic surface and a hydrophilic surface was 1:0.63 in the condenser, and the eighth atmospheric water harvesting generator included a moisture-condensing substrate having a structure including hydrophilic particles on one hydrophobic surface and an amphiphilic structure in which the area ratio of a hydrophobic surface and a hydrophilic surface was 1:0.03 in the condenser. As a result of checking the water yields generated by the fourth atmospheric water harvesting generator, the fifth atmospheric water harvesting generator, the sixth atmospheric water harvesting generator, the seventh atmospheric water harvesting generator and the eighth atmospheric water harvesting generator, when the water yield generated by the fourth atmospheric water harvesting generator was set as 100%, it was confirmed that the water yield generated by the fifth atmospheric water harvesting generator was 95%, the water yield generated by the sixth atmospheric water harvesting generator was 93%, the water yield generated by the seventh atmospheric water harvesting generator was 86%, and the water yield generated by the eighth atmospheric water harvesting generator was 81%.

What is claimed is:

1. An atmospheric water harvesting generator, comprising:
   a Peltier element-based cooling/heating part, wherein an air inlet hole is formed in the Peltier element-based cooling/heating part to introduce a moisture-containing air from an outside to an inside through the air inlet hole, and an air circulation hole is formed to introduce a moisture-removed air through the air circulation hole to cool or heat the introduced air;
   an adsorption/desorption part, wherein the adsorption/desorption part is connected to the Peltier element-based cooling/heating part, into which air cooled or heated by the Peltier element-based cooling/heating part is introduced to adsorb or desorb moisture contained in the introduced air;
   a condensation part, wherein the condensation part is connected to the adsorption/desorption part and the Peltier element-based cooling/heating part such that air is introduced from the adsorption/desorption part, the moisture contained in the introduced air is condensed, and the air from which the moisture has been removed is discharged to the outside or transferred to the Peltier element-based cooling/heating part; and
   a water storage part, wherein the water storage part is connected to the condensation part to store a condensed water, wherein the condensed water is condensed in the condensation part.

2. The atmospheric water harvesting generator according to claim 1, wherein the Peltier element-based cooling/heating part comprises a cold chamber, a Peltier element and a hot chamber,
   wherein the air inlet hole is formed in the cold chamber to introduce the moisture-containing air from the outside into the cold chamber,
   wherein the air circulation hole is formed in the hot chamber to introduce the moisture-removed air into the hot chamber,
   wherein the cold chamber is in contact with a cold surface of the Peltier element, and the hot chamber is in contact with a hot surface of the Peltier element, and wherein the cold chamber and the hot chamber are separated from each other.

3. The atmospheric water harvesting generator according to claim 1, wherein the adsorption/desorption part comprises a first chamber and a second chamber,
   wherein the first chamber and the second chamber respectively comprise a plurality of adsorbents therein, and
   wherein the first chamber and the second chamber are separated from each other.

4. The atmospheric water harvesting generator according to claim 1, wherein the condensation part comprises:
   a cooler for cooling the air introduced from the adsorption/desorption part; and
   a condenser for condensing the moisture contained in the air introduced from the adsorption/desorption part.

5. The atmospheric water harvesting generator according to claim 1, further comprising:
   a first valve, wherein the first valve is installed in a first path, wherein air moves from the Peltier element-based cooling/heating part to the adsorption/desorption part through the first path to control a flow of air moving from the Peltier element-based cooling/heating part to the adsorption/desorption part; and
   a second valve, wherein the second valve is installed in a second path, wherein air moves from the adsorption/desorption part to the condensation part or the Peltier element-based cooling/heating part through the second path to control the flow of air moving from the adsorption/desorption part to the condensation part or the Peltier element-based cooling/heating part.

6. The atmospheric water harvesting generator according to claim 5, further comprising:
   a control device, wherein the control device is connected to the first valve, the second valve, the air inlet hole and the air circulation hole to analyze the flow of air moving through the first valve, the second valve, the air inlet hole or the air circulation hole; and
   an electricity supply part, wherein the electricity supply part is connected to the control device and supplies an electricity to the control device, the first valve, the second valve, the air inlet hole, the air circulation hole or the Peltier element.

7. The atmospheric water harvesting generator according to claim 6, wherein the electricity supply part is an auxiliary battery for charging a smartphone or a portable solar-powered battery.

8. The atmospheric water harvesting generator according to claim 3, wherein the adsorbent has a nanopore structure.

9. The atmospheric water harvesting generator according to claim 8, wherein the nanopore structure has a BET specific surface area of 350 to 4,000 $m^2/g$, a pore size of 5 to 50 Å and a pore volume of 0.2 to 6.0 $m^2/g$.

10. The atmospheric water harvesting generator according to claim 8, wherein the adsorbent comprises a metal-organic framework (MOF).

11. The atmospheric water harvesting generator according to claim 10, wherein the metal-organic framework comprises at least one selected from the group consisting of MOF-801, MOF-803, MOF-805, MOF-841, MIL-101 (Cr), MIL-101 (Al), MIL-53 (Al), UiO-66, Cr-soc-MOF-1, CAU-10-H, DUT-67 and $Co_2Cl_2$ (BTDD).

12. The atmospheric water harvesting generator according to claim 4, wherein the condenser comprises a moisture-condensing substrate having an amphiphilic structure.

13. The atmospheric water harvesting generator according to claim 12, wherein the moisture-condensing substrate having the amphiphilic structure has a structure including hydrophilic or super-hydrophilic particles on one hydrophobic or super-hydrophobic surface or a structure in which a hydrophilic or super-hydrophilic pattern is formed on the one hydrophobic or super-hydrophobic surface.

14. The atmospheric water harvesting generator according to claim 13, wherein the structure in which the super-hydrophilic pattern is formed on the one super-hydrophobic surface comprises:
   a substrate, wherein titanium dioxide ($TiO_2$) is formed on the substrate in a hydrophilic domain pattern on one surface; and
   a compound represented by Chemical Formula 1, wherein the compound is coated on a surface of $TiO_2$, wherein the hydrophilic domain pattern is a cylinder-shaped pattern, a cone-shaped pattern, a quadrangular prism-shaped pattern, a quadrangular pyramid-shaped pattern, a triangular prism-shaped pattern, a triangular pyramid-shaped pattern or a star-shaped pattern:

[Chemical Formula 1]

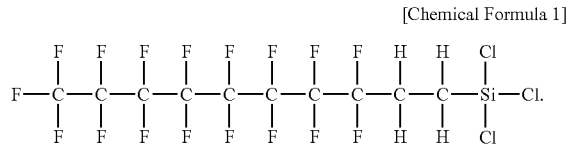

15. The atmospheric water harvesting generator according to claim 12, wherein the moisture-condensing substrate having the amphiphilic structure has an area ratio of a hydrophobic surface and a hydrophilic surface of 1: 0.05 to 0.6.

16. The atmospheric water harvesting generator according to claim 1, wherein the atmospheric water harvesting generator comprises:
   a flow of first air, wherein the flow of first air is discharged from the inside to the outside after the air introduced from the outside to the inside moves sequentially to the air inlet hole, a cold chamber, a first valve, a first chamber adsorbing moisture, a second valve and a cooler; and
   a flow of second air in which after the air from which the moisture has been removed in the condensation part moves sequentially to the air circulation hole, a hot chamber, the first valve, a second chamber for desorbing moisture, the second valve and a condenser, the condensed water which is condensed in the condenser is stored in the water storage part,
   wherein the flow of the first air and the flow of the second air proceed simultaneously to continuously harvest water.

17. The atmospheric water harvesting generator according to claim 16, wherein in the atmospheric water harvesting generator, the roles of the first chamber and the second chamber are switched by the first valve such that the first chamber desorbs moisture and the second chamber absorbs moisture, and at the same time, the flow of air moving to the condensation part and the hot chamber is controlled by the second valve such that water can be harvested continuously.

* * * * *